United States Patent [19]

Walworth

[11] 4,116,003
[45] Sep. 26, 1978

[54] MULTI-SPEED HYDRAULIC DRIVE TORQUE CONVERTER

[76] Inventor: Ralph Franklin Walworth, P.O. Box 11711, St. Petersburg, Fla. 33733

[21] Appl. No.: 820,566

[22] Filed: Aug. 1, 1977

[51] Int. Cl.$^2$ ............................................. F16D 39/00
[52] U.S. Cl. ........................................ 60/487; 74/467
[58] Field of Search ..................... 60/487; 74/467, 468

[56] References Cited

U.S. PATENT DOCUMENTS

| 3,065,822 | 11/1962 | McAfee et al. | 74/467 |
| 3,192,788 | 7/1965 | Fodrea | 74/467 |
| 3,968,651 | 7/1976 | Walworth | 60/487 |

*Primary Examiner*—Samuel Scott
*Assistant Examiner*—James Yates
*Attorney, Agent, or Firm*—Oldham, Oldham, Hudak & Weber Co.

[57] ABSTRACT

The trans-clutch torque converter of the invention includes a pair of parallel input and output shafts having pairs of interengaging input and output gears on the shafts together with pairs of idler or transfer gears positioned on the shafts between the other pairs of gears thereon and with hydraulic pressure fluid galleries being formed in the housing chamber and with the speed output of the converter being determined by the interengagement and relationship between the gears on the input and output shafts, the improvement comprising using special herringbone gears and side pressure vanes slidably positioned in the housing to move axially thereof for maintaining pressure engagement between the sides of the gears on the input and output shafts after wear thereof, and wherein the gears each have a recess formed in one side face thereof connecting to a hub opening to transmit pressure liquid to the support shaft and a pressure relief orifice therein to aid in controlling the gear interengagement and speed control action of the converter. Each gear also includes an end member made of a softer material than the remainder of the gear.

7 Claims, 8 Drawing Figures

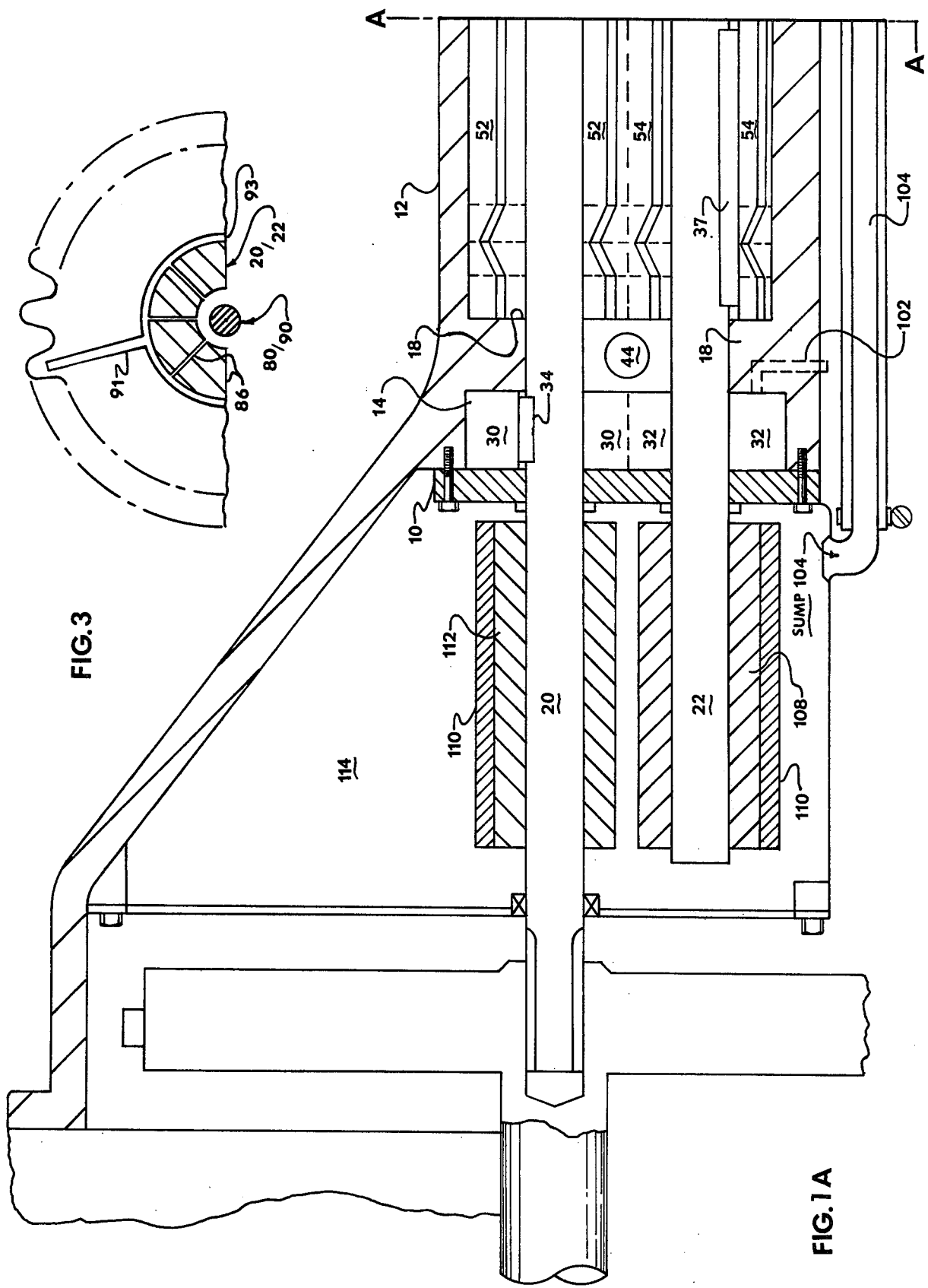

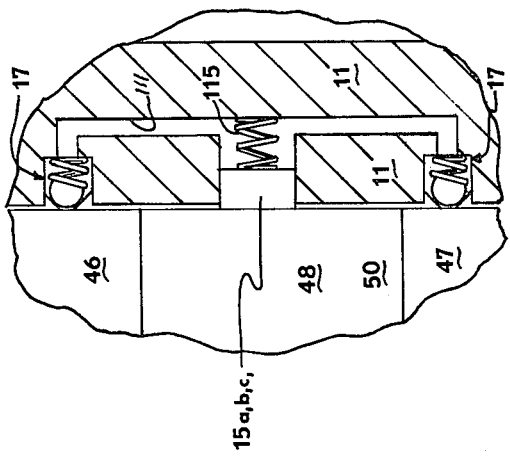
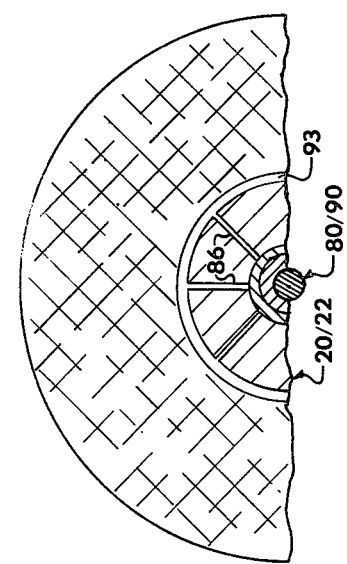
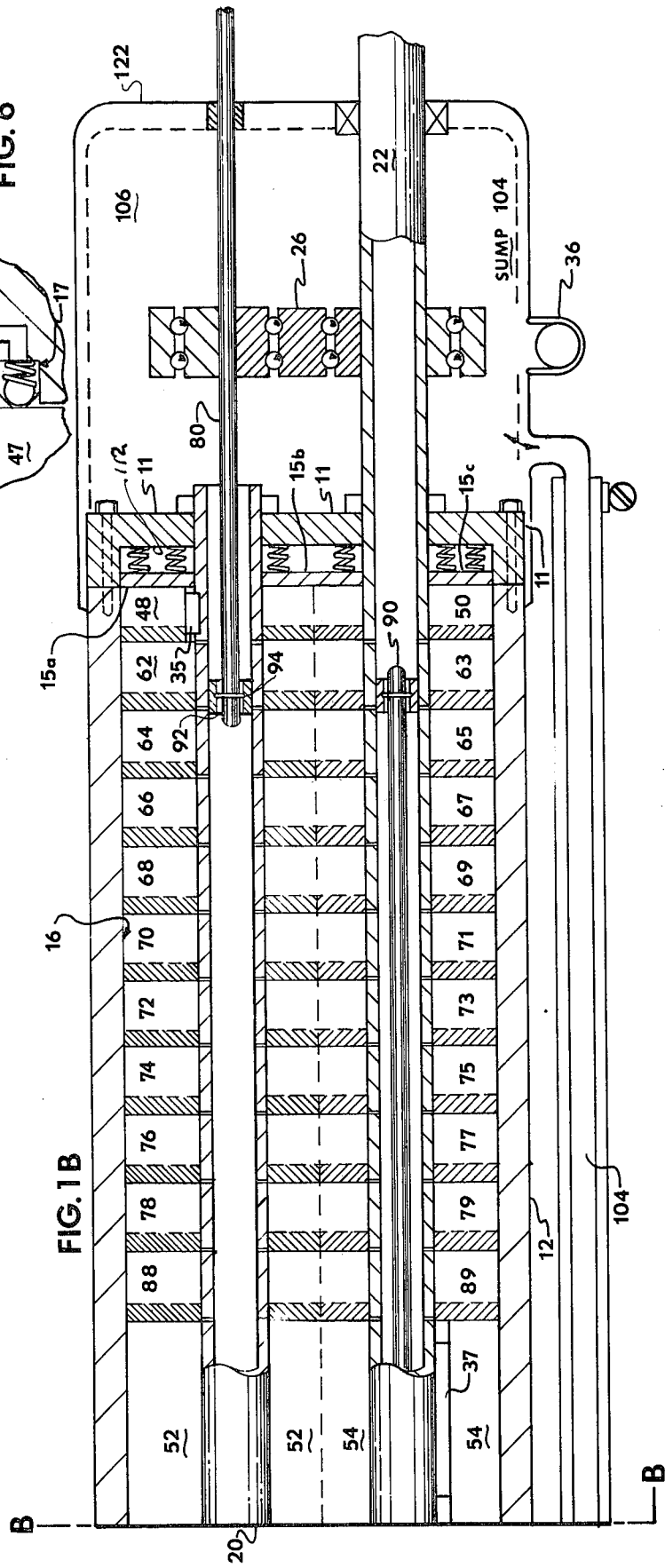

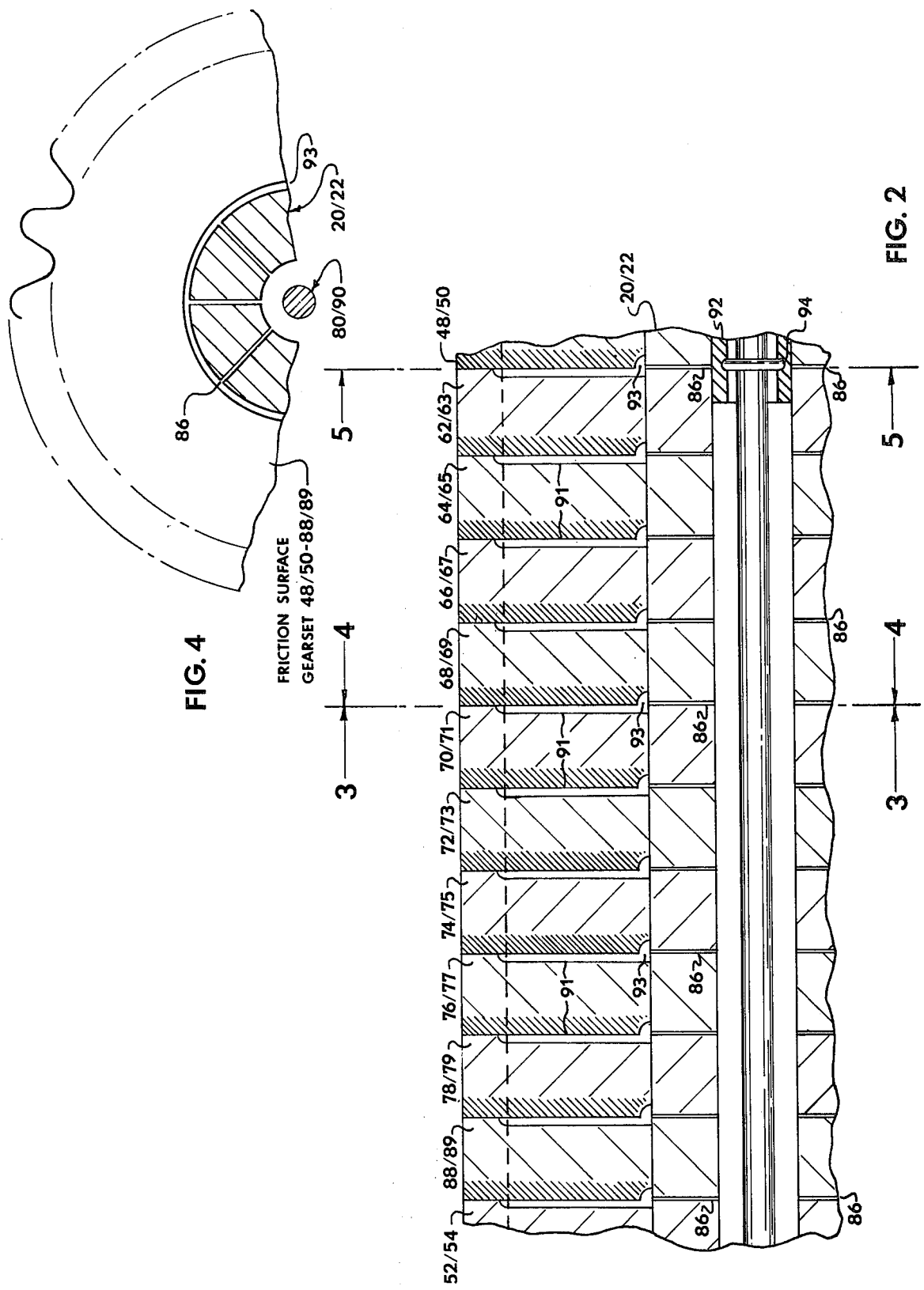

MULTI-SPEED HYDRAULIC DRIVE TORQUE CONVERTER

BACKGROUND OF INVENTION

With relation to torque converters of a type shown in my prior U.S. Pat. No. 3,968,651, further development work and consideration of the torque converter disclosed therein indicates that some improvements may be possible to the construction disclosed. That is, it may be necessary to provide axial take-up in the sets of gears in the torque converter as wear occurs on the sides of the gear assemblies, and it may be desirable to provide improved types of means for insuring radial separation planes being readily created between different sets of the input, output or idler gears in the torque converter. In general, other improvements in the controls and functioning of the device may be desirable.

Hydraulic gear pumps and gear motors are historically sturdy, simple and small devices that have established their durability in functions such as oil pumps in auto and truck engines.

Connecting a gear pump to an engine to have it supply pressurized fluid to a gear motor connected to the drive wheels of a vehicle would make a transmission system with a one-to-one gear ratio; i.e. an unsatisfactory torque-multiplication capability to accelerate a vehicle, and an unsatisfactory loss of torque through leakage in the pump and motor units.

However, in the trans-clutch unit of the invention, several more sets of gears are contained within a common compartment and these transfer gears can be clutched to either the pump or the motor gears, in arrangements that provide a wide range of torque-multiplication and make the leakage factor insignificant.

Accordingly, it is the general object of the present invention to provide an improved torque converter wherein automatic axially directed wear take-up means are provided to maintain low rates of working pressure loss as wear of the sides of the gears occurs.

Another object of the invention is to provide improved control means for aiding in setting up and creating high pressure separation planes between preselected pairs of adjacent gears of axially aligned sets of gears in the torque converter.

Other objects of the invention are to provide a check valve and vane construction for use in establishing gear side pressure in the trans-clutch torque converter; to provide a multiple individual gear set or assembly with herringbone shaped gear teeth and a special wear composition gear as an end gear in each multiple gear set; to provide fluid pressure transmitting slots in selected side areas of the gears for maintaining gear tooth alignment in adjacent sets of gears in the torque converter; to provide improved circulatory systems for liquids in the torque converter; and to improve the dependability, operability and serviceability of the torque converter.

Reference now is particularly directed to the accompanying drawings, wherein:

FIGS. 1A and 1B are vertical sections, somewhat diagrammatic, of the trans-clutch torque converter of the invention;

FIG. 2 is an enlarged fragmentary vertical section, partially diagrammatic, showing a modified ratio selecting gear shaft unit of the invention;

Figure 7:
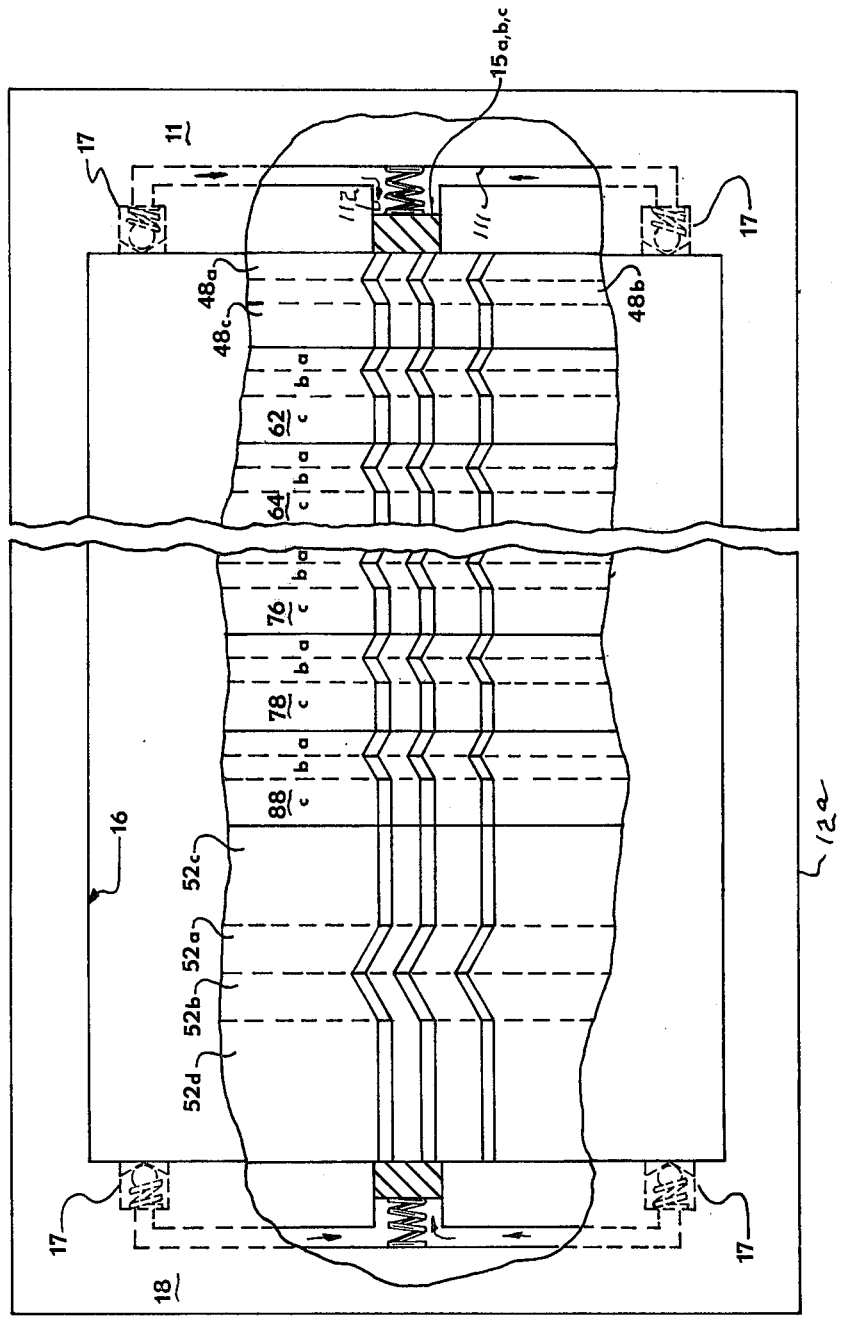

FIGS. 3, 4 and 5 are fragmentary sections on line 3—3, 4—4 and 5—5, respectively, of FIG. 2 to show gear shift and speed control members;

FIG. 6 is a diagrammatic horizontal section through the end plate 11 and associated means; and FIG. 7 is a diagrammatic elevation of the gears in the housing chamber 16.

Many parts of the structure of the present apparatus are shown diagrammatically in the accompanying drawings. Also, corresponding numerals are used on the components of this apparatus equivalent to those used in identifying the components of the apparatus shown in my prior U.S. Pat. No. 3,968,651 and the drawings shown therein are hereby referenced to for the present application whereby all of the subject matter thereof is a part of the disclosure of the present application. Thus, in describing the present invention, the disclosure of my prior patent is a part hereof and the construction and operation of the present apparatus is identified in detail where it differentiates over or deviates from or adds to the teachings of my prior patent.

In the drawings in some instances, only one gear 88 or 78, for example, might be shown out of the gear sets 88/89 and 78/79 or one of the shafts 20 or 22 may be shown, but the equivalent construction is provided in the other member not illustrated in the drawings as these constructions are just duplicated in similar parts in the apparatus of the invention.

In the structures shown in FIGS. 1 and 2 of the drawings, it will be seen that the motor section or output gears 52 and 54 have been reversed in axial relationship in relation to the pump section gears 48 and 50, but the gear alignment and relationship as in the structure shown in my prior patent can be used, when desired.

CONSTRUCTION AND OPERATION

The housing 12 is bolted to the engine and contains two parallel shafts, input shaft 20 and output shaft 22. The input shaft 20 is suitably connected to the engine drive shaft, while the output shaft 22 is connected to the vehicle drive shaft.

Within the housing 12 there are two pressurized compartments, pump compartment 14 and the torque-multiplication compartment 16. Outside of these pressurized compartments are two enclosed end compartments 106 and 114, whose lower portions receive overflow fluid from the pressurized compartments and act as a sump for the excess fluid. These compartments also contain the "cruising" direct drive assemblies (sprockets 108 and 112 plus chain 110 or like diagrammatically shown in 114 and controlled in any known manner); and, the control and valving mechanism 26 in 106 which has an external control connecting thereto, or by a suitable automatic internal control.

When the shaft 20 is put into rotation by the engine, the pump 30/32 in compartment 14 draws fluid from the sump 104 via means not fully shown but including a bore or tube 102 that operatively connects the bore 36 to a filter and radiator (not shown) and supplies liquid to gallery 38 and gear pump 30/32 carries it into the gallery 40 at very high pressure. The gallery 40 connects with the gallery 46 via ducts 42, 44 and 45 in the housing wall 18; therefore, the gallery 46 also becomes highly pressurized. And, since the gallery 47 is part of the compartment 16 that houses both galleries, all galleries 40, 46 and 47, as present in the apparatus and as shown in my prior patent, are hydrostatically maintained at the same high pressure whenever the adjustable pressure control and overflow valve 56 in the end plate 11 (or operatively connecting to housing wall 18)

is set up or adjusted for as a pressure relief device draining liquid through it to the sump 104.

This hydrostatic pressure within the compartment 16 provides the force necessary to move sets of idler or transfer gears 62/63 through 88/89 horizontally along the tubular shafts 20 and 22. Movement is selectively achieved by either "pressurizing" the plane of separation between adjacent gear sets or by relieving the pressure plane between them. Control of the pressurizing plane is achieved through left and right movement of the control rods 80 and 90 as directed by their connecting member 26 and control forces exerted upon it either automatically or as disclosed in my prior patent, and including external unitary controls for these rods 80 and 90.

When the orifices 86 are not covered by seals 82 or 92, ambient (low) pressure extends from the gallery through slot 91, recess 93 and bores 86 to the sump that operatively connects to the bores of tubes 20 and 22. Since only one or two planes of orifices 86 are covered by seals 82 and 92, at any instant, it follows that all the other planes between gear sets are then at low pressure relative to the hydrostatic pressure within the compartment 16.

Since the high pressure within the compartment 16 pervades the planes between the sides of the gear sets 52/54 and wall 18, as well as between 48/50 and plate 11, it follows that any low pressure planes between gear sets between them will receive the full force of the hydrostatic head in both directions parallel to the shafts 20 and 22. In short, the gear sets are forced together by very high pressure unless a high pressure plane is introduced between them.

It is the function of the control rods 80/90 to provide that high pressure plane and to move it axially as needed to couple different sets of gears to either the pump gear set or the motor or output gear set in compartment 16. Such rods or tubes 80/90 and associated means may be of the construction shown in my prior patent or be slightly modified as shown in FIGS. 2–5 herein.

As the control rods 80/90 are shown in the drawings, seals 82 and 92 cover the orifices 86 in the plane between gear sets 64/65 and 62/63, therefore liquid cannot escape from gear set 62/63's ducts 91, 93, so the high pressure within the compartment 16 seeps between these gear sets and separates them along this plane. Since this hydrostatic pressure works axially along the shafts 20/22 from this plane, gear set 48/50 stands balanced in the hydrostatic pressure that is exerted from the opposite plane between the gear sets 48/50 and end plate 11.

Conversely, the pressure in that plane against gear sets 62/63 is not balanced by opposing pressure until it passes axially through gear sets 64/65 through 52/54 where the pressure plane between the housing wall 18 and 52/54 provides an equal and opposite force.

In that hydrostatically induced configuration, the hydrodynamic effects are these. The gear 48 is mechanically coupled to shaft 20 by key 35. It therefore rotates with the shaft 20 and by its meshing with the gear 50 combines to form a gear pump in the chamber 16. The direction of its rotation causes the gear pump 48/50 to force fluid from gallery 46 to the gallery 47. Since the rest of the compartment 16 is filled with gear sets, the only way that fluid from the gallery 46 can move into the gallery 47 and return to 46 for recirculation, is to rotate the rest of the gear sets in an opposite direction.

Since the rest of the gear sets are at this instant hydrostatically combined with gear sets 52/54, and since 54 is mechanically coupled to the shaft 22 by key 37, the fluid cannot move from the gallery 47 back to 46 unless the shaft 22 and some gear sets secured thereto are rotated.

To move successively through second and subsequent "gear ratios", it is only necessary that the control tubes or rods 80/90 be moved by stages to the left from the position shown.

A "syncro-mesh" or clutching action is accomplished as follows. As the rods 80/90 move slightly left, the seal surfaces or rings 82 and 92 momentarily cover the orifices on both planes on either side of the gear sets 64/65. This prevents the escape of high pressure fluid on both planes on the sides of the gear sets 64/65 which is decoupled from its former clutch action with gear set 66/67 and the rest.

Moving slightly further left, rings 82 and 92 continue to cover the 86 orifices on the plane between gear sets 64/65 and 66/67. However, the rings have uncovered the orifices on the plane between 62/63 and 64/65. The resulting high pressure on the former plane forces gear set 64/65 to the right and into contact with gear set 62/63, which results in 64/65 rotating with 62/63 and 48/50 and thereby becoming part of the pump.

The subtraction of gear set 62/63 from the motor group of gear sets and its addition to the pump gear set, when such action is provided, causes the volume of fluid moved from the gallery 46 to 47 by the pump to be doubled. Simultaneously, the capacity of the motor gear sets to return fluid from the gallery 47 to 46 is reduced, therefore the motor gear sets must rotate faster than before relative to the pump rate of rotation. The result of this change of ratios is the equivalent of advancing from "first" to "second" gear.

Successive changes of ratio are similarly effected as the control rods 80/90 continue to be moved further to the left until a slightly "overdrive" ratio is reached. At this point, it is most efficient to engage the "cruising" sprocket assembly by any known means and to open valve 56 so that fluid is circulated by pump 30/32 against no significant back pressure. This will keep the torque chamber filled with fluid for instantaneous downshifting if necessary, without wasting engine torque. The pump and motor gear sets in compartment 16 will also continue to rotate in a "no-load" state as long as the valve 56 remains open, of course.

Reverse drive is accomplished as follows. Returning to the pressurized condition with the control rods 80/90 again pressurizing the plane between gear sets 62/63 and 48/50, a second valve 60, which penetrates the plate 11 from gallery 47 into space 106 or is otherwise operatively connected thereto, is designed as follows. The pressure setting on the valve 60 is adjusted to be lower than the setting of the valve 56, but not low enough to lower the hydrostatic head so that gear sets will fail to clutch and holt together. The valves 56 and 60 are operatively positioned and connect to bore 44 and gallery 47 as shown in FIG. 7 of my prior patent.

So when the valve 60 is adjusted as stated for control function, the excess of fluid delivered into the gallery 46 by pressurizing pump 30/32 does not flow into the sump 106 via valve 56. Instead, it must exit to the sump via valve 60 which operatively connects to the gallery 47. For the fluid to get to the gallery 47 from the gallery 46, since the torque pump gear set 48/50 has approximately half of the volumetric capacity of the pressurizing pump 30/32, it can only move half of the excess fluid from the gallery 46 to 47, the remainder must rotate the motor gear set as it forces its way from the gallery 46 to 47 and the direction that the motor gear set must rotate is opposite to "normal" which results in rotating the shaft 22 in an opposite direction or "reverse".

EFFICIENCY AND PERFORMANCE AIDS

Since the gear sets in the compartment 16 are continually being clutched back and forth between the pump and motor gear sets in normal operations, it is necessary that the gear sets be dynamically forced to align themselves each time so that the teeth of the adjacent gear sets are side by side and leakage paths from the gallery 47 to 46 are not formed in the spaces between gear teeth. This alignment, as a feature of the present invention, is provided by slot 91 in one side of each gear set. The slot 91 extends from an annular duct 93 at the shaft opening to a point beyond the radius of the adjacent gear tooth root. Thus, if the gear with the slot 91 is rotating when its plane of rotation becomes depressurized by the removal of the rings 82 and 92 from its orifices 86, the gear will continue to rotate until the adjacent gear tooth moves over the slot 91 and closes that passage to fluid leakage. Thus, adjacent gear sets cannot seat (clutch) each other until their teeth are aligned.

Other leakage paths between adjacent gear sets will develop with wear on the sides of the gear sets, and in time the leakage could reduce the performance of the trans-clutch by excessive leakage from the gallery 47 to 46. For this reason, wear compensation means such as end vanes 15a, 16b and 15c are now provided and are slidably positioned in the end plate 11 to move axially of the housing. These vanes are lightly held against one face of the gear set 48/50 by pressure from springs 115, but are hydrostatically balanced against the pressure fluctuations in gallery 46 and 47 by the one-way check valves 17 that open into each of these galleries. In operation, the gallery that has the higher pressure forces the check valve on that side to open and enables fluid to glow through bores 111 to a center slot 112 in the housing where the individual vanes 15a, 15b and 15c are slidably positioned. The pressure liquid hence combines with the springs 115 to pressurize the spring side of the vane slightly more than the side facing the gear set. This urges the vanes axially inwardly of the chamber to slidably bear on the side faces of the adjacent gear set 48/50 or in a slightly modified housing 12a, FIG. 7, on the gear set 52/54 also.

The result, of course, is that as the sides of the gear sets wear, the vanes, which are made of suitable material, engage the sides of the adjacent gear set, and are biased to extend slightly into the compartment 16, moving the gear sets collectively toward the wall 18 and maintaining the close spacing between them. These vanes may be duplicated at the opposite end of the compartment 16 (FIG. 7), if desired.

By the present invention, each gear 48, 50, 62, 52, 64, etc., is formed as a multiple-gear gear set. All of these gear sets are fabricated so that each has a herringbone tooth section that meshes with its opposing gear. The purpose of this configuration is to assure that gear sets always move axially on shaft 20 and 22 as a set with a single plane, and the gears on one shaft cannot interfere with the teeth of an adjacent gear on the opposite shaft. Hence, the pump section gears 48, 50 thus really would be made from two metal gears 48a, 48b and a brake block or other composition type material gear 48c and likewise the transfer gears are each made of three gears again comprising two metal gears and one brake block or wear type material composition gear at an end of the individual three-gear gear set. In the output gears, the output gear 52 and its mating gear 54 would be formed from four gears, all metal, and with just the two center gears 52a and 52b having the herringbone teeth thereon and with end gears 52c and 52d having conventional gear teeth formed thereon.

The softer material gears 48c, 62c, etc. are indicated in FIGS. 1B and 2 and are indicated by the partial sectioning thereof.

The herringbone configuration has another advantage. The 48a and 48b portions of the gears which incorporate the herringbone teeth can be formed of very hard and durable materials, capable of meshing under load with little wear. Fastened to the sides of these gears are gears 48c formed of materials which have poor wearing qualities, but which have the character of making good friction contact with the sides of the hard herringbone gear sets 48a through 88a. This friction material gear is suitably carried by and/or secured to its metal herringbone portion and experiences no tooth wear at all. Yet its teeth perform the vital function of nearly meeting to prevent leakage of fluid from high to low pressure galleries.

As previously indicated, the valve 56 can be fully opened for pressure release for no load operation of the pump and motor gear sets in the compartment 16. But the valve 56 is of the adjustable pressure opening type so that it normally is set to limit the operative or working pressure in the compartment 16.

My prior patent, referred to hereinbefore, and the structure shown therein is referred to for any detail or structure not fully shown herein.

The torque converter of the invention will provide a variety of output speeds, it should require minimum service or repair, and should achieve the objects of the invention.

While one complete embodiment of the invention has been disclosed herein, it will be appreciated that modification of this particular embodiment of the invention may be resorted to without departing from the scope of the invention.

What is claimed is:

1. In a multi-speed torque converter, a housing defining a chamber,
   parallel input and output shafts in said housing chamber, said input shaft being driven,
   a pair of input gears individually positioned on said shafts with only the gear on the input shaft being secured thereto,
   a plurality of pairs of transfer gears journalled on said shafts with one gear of each pair being on one of said shafts,
   a pair of output gears individually positioned on said shafts with only the gear on said output shaft being secured to said shaft,
   an input and an output gallery being formed in the housing by said gears, and
   means operatively positioned in the housing to move pairs of said transfer gears axially to engage said input or said output gears to form an operative gear unit therewith and to retain said transfer gears in their given positions when the converter is in operation;
   the improvement comprising side pressure vane means slidably positioned in said housing at an end thereof for movement axially of said chamber to extend therefrom and engage side faces of adjacent gears; bore means in the housing connecting to the axially outer surfaces of said vane means, and check valves is said housing for receiving housing chamber pressure and transmitting it to said bore means for urging said vane means axially inwardly of said chamber to press axially against said gears.

2. A torque converter as in claim 1 where each gear is a multi-gear unit including a pair of metal gears having herringbone shaped teeth thereon, and whose teeth operably connect to the teeth of a gear on the opposite shaft to form a gear set that moves axially as a unit, and an end gear whose teeth operably connect to the teeth on an adjacent gear, said end gear being made from a less wear resistant material than said pair of gears.

3. A multi-speed torque converter as in claim 2 where each gear unit includes an end gear made from a less wear resistant material than said pair of metal gears.

4. A trans-clutch torque converter comprising a housing having a pressure chamber therein, and means supplying hydraulic fluid under pressure to said pressure chamber,
  parallel input and output shafts journalled in the housing and extending through said chamber,
  a first pair of interengaging input gears positioned on said shafts in said chamber with the gear on said input shaft being secured thereto,
  a pair of interengaging output gears mounted on said shafts in said chamber with the gear on said output shaft being secured thereto,
  at least one pair of idler gears on said shafts between the other sets of gears thereon,
  hydraulic fluid pressure galleries being formed in said chamber, and
  said shafts being tubular and having an orifice opening therein intermediate each pair of said interengaging idler gears,
  common shift means including an axially movable member in each of said shafts and carrying a seal means for sealing a set of openings between selected adjacent pairs of said gears, the pressure fluid in said compartment producing axial pressures on the sides of pairs of gears to lock them to and abut them against the gears adjacent their opposite sides,
  a side face of each of said gears having a recess formed therein and extending from a hub opening of the gear to a gear tooth and part of the length of such tooth for transmitting pressure fluid to said support shaft and to a said orifice for passage to said shaft bore for flow to a sump; and,
  said recess in said side face of each of said gears includes an annular portion extending around said hub opening in each gear and a radially extending portion extending out to a said gear tooth and part of the length thereof whereby pressure fluid will flow to and through said recess only when the teeth of a pair of adjacent abutting gears are out of alignment to expose part of said radially extending portion of said recess.

5. A trans-clutch torque converter comprising a housing having a pressure chamber therein,
  parallel input and output shafts journalled in the housing and extending through said chamber,
  a first pair of interengaging input gears positioned on said shafts in said chamber with the gear on said input shaft being secured thereto,
  a pair of interengaging output gears mounted on said shafts in said chamber with the gear on said output shaft being secured thereto,
  at least one pair of idler gears on said shafts between the other sets of gears thereon,
  hydraulic fluid pressure galleries being formed in said chamber, and
  said shafts being tubular and having an orifice opening therein intermediate each pair of said interengaging idler gears,
  common shift means including an axially movable member in each of said shafts and carrying a seal means for sealing a set of openings between selected adjacent pairs of said gears, the pressure fluid in said compartment producing axial pressures on the sides of pairs of gears to lock them to the gears adjacent their opposite sides, and
  an end face of each of said gears having a recess formed therein and extending from a hub opening of the gear to a gear tooth and part of the length of such tooth for transmitting pressure liquid to said support shaft and to a said orifice for passage to said shaft bore for flow to a sump; and
  wear compensating means are slidably positioned in said housing at an end thereof for movement parallel to the axis of said shafts, such means being movable to project into the said pressure chamber.

6. A trans-clutch torque converter as in claim 5 where check valve members connect housing bores to said pressure galleries, said bores connecting to axially outer areas of said wear compensating means for transmission of gallery pressure thereto.

7. A trans-clutch torque converter as in claim 6 where spring means also urge said wear compensating means towards said pressure chamber.

* * * * *